June 12, 1956 — A. E. USHAKOFF — 2,749,737
APPARATUS FOR TREATING PERMEABLE SHEETS WITH FLUIDS
Filed Oct. 14, 1954 — 3 Sheets-Sheet 1
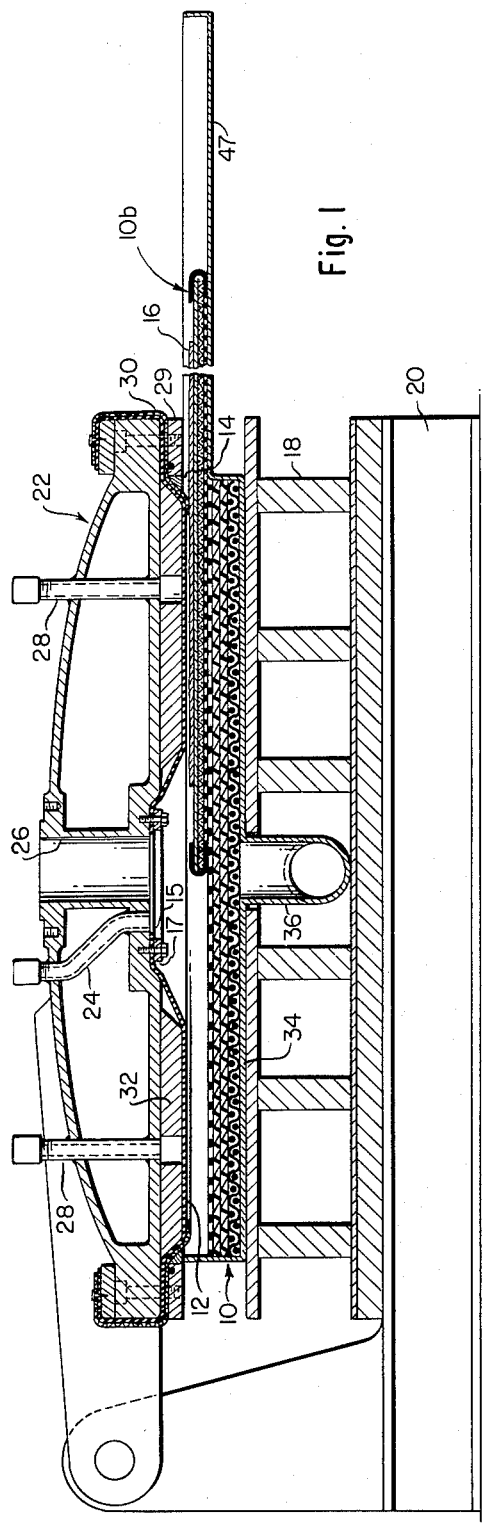
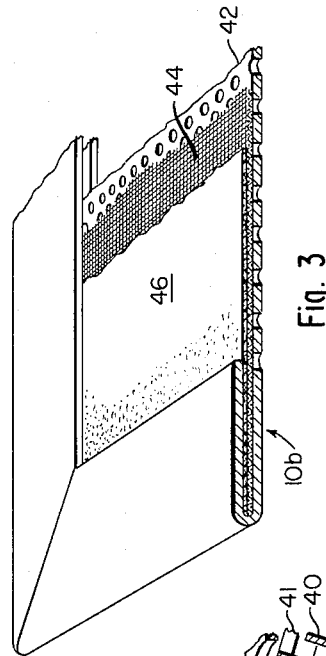
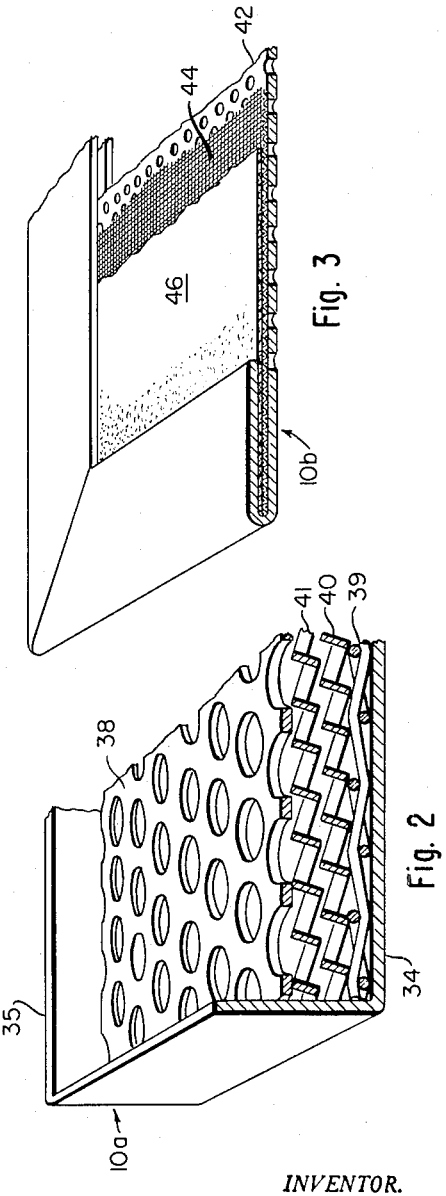
INVENTOR.
ALEXIS E. USHAKOFF
BY
ATTORNEYS

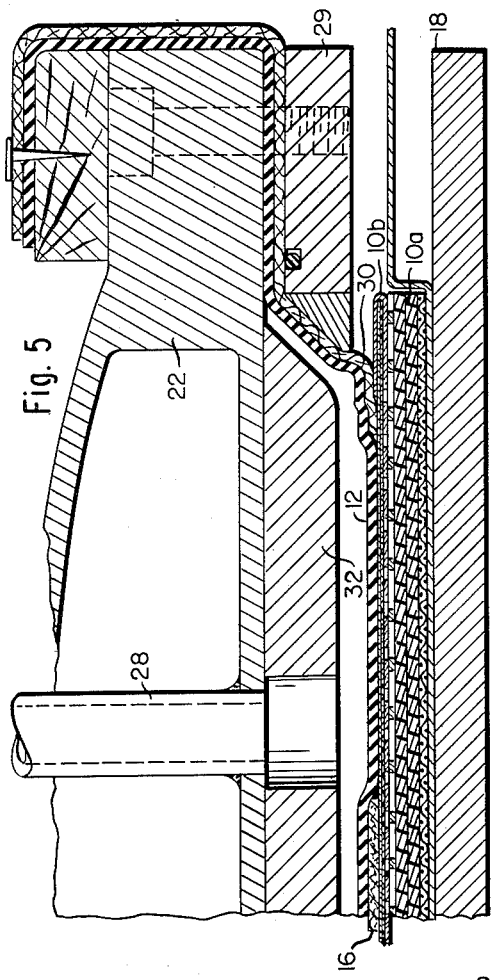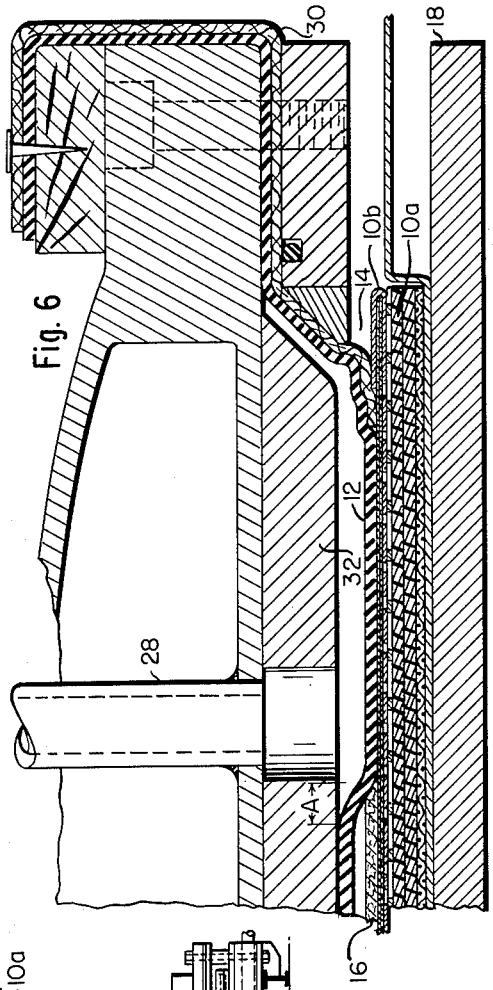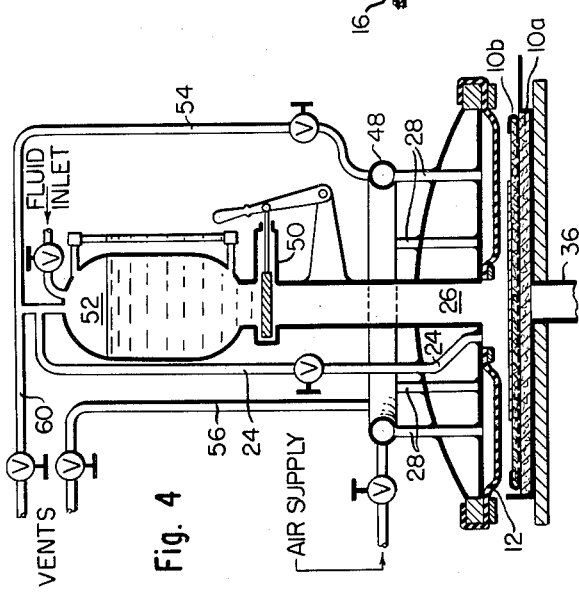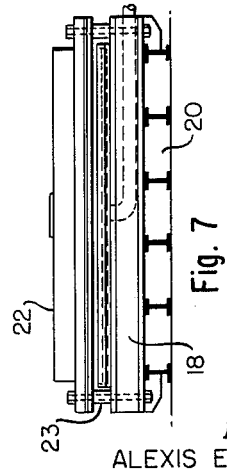

June 12, 1956 A. E. USHAKOFF 2,749,737
APPARATUS FOR TREATING PERMEABLE SHEETS WITH FLUIDS
Filed Oct. 14, 1954 3 Sheets-Sheet 3
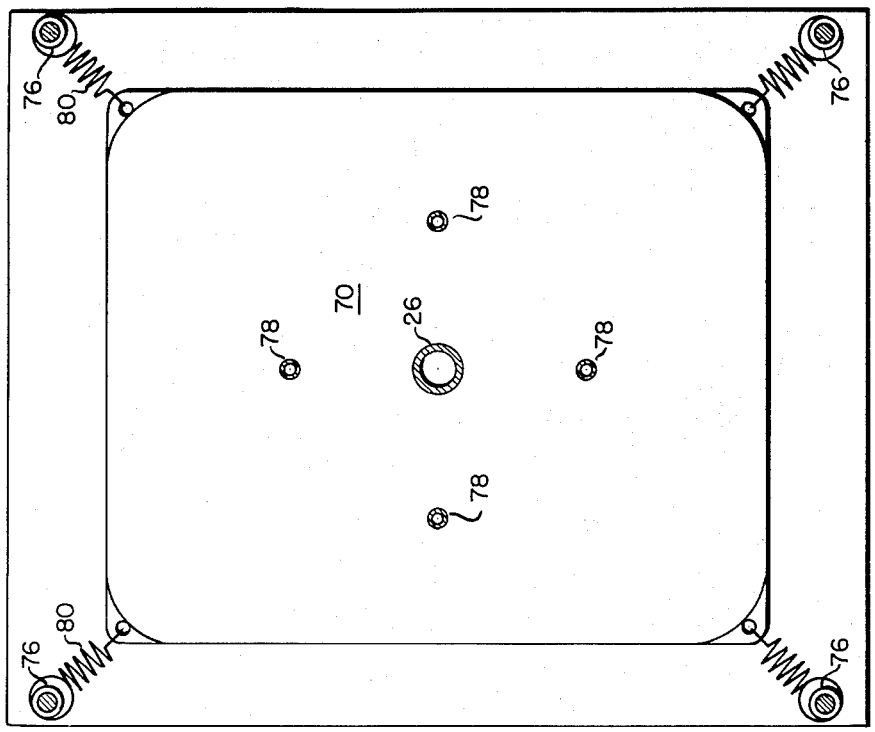
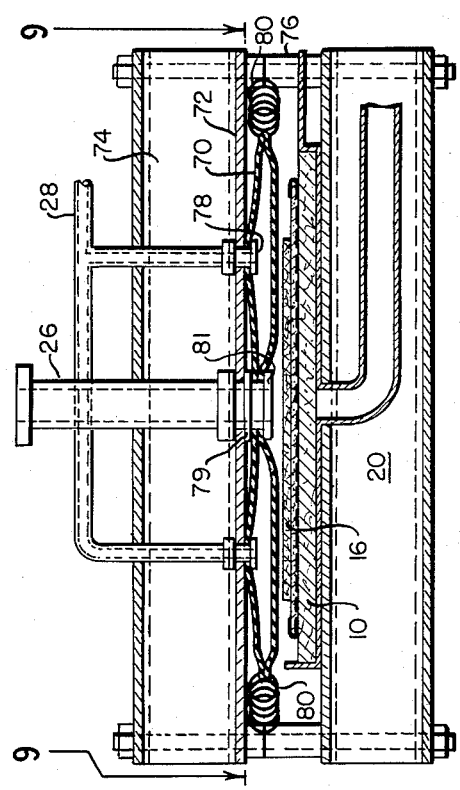
*INVENTOR.*
ALEXIS E. USHAKOFF
BY
ATTORNEYS United States Patent Office 2,749,737
Patented June 12, 1956

2,749,737

APPARATUS FOR TREATING PERMEABLE SHEETS WITH FLUIDS

Alexis E. Ushakoff, Beverly, Mass., assignor to Secotan, Inc., Somerville, Mass., a corporation of Massachusetts Application October 14, 1954, Serial No. 462,345

18 Claims. (Cl. 69—29)

The present invention relates to improvements of apparatus of the type described in my copending application Serial No. 233,924 filed June 27, 1951, which issued as Patent No. 2,702,229 on February 15, 1955 which is directed to the treating of pervious sheet materials such as hides or skins with fluids. In general, such apparatus comprises a porous bed for supporting the sheet, a membrane overlying the bed and sheet thereon, means for applying a fluid pressure differential across the membrane to press it against the bed, and means to deliver the desired treating fluid between the sheet and membrane. The sheet to be treated is placed on the porous bed and the bed and sheet are covered with the membrane. With a fluid pressure differential applied across the bed and membrane to force the membrane tightly against the bed, the treating fluid is introduced between the sheet and membrane while the pressure differential is maintained. As a result, the membrane tightly seals those areas of the bed uncovered by the sheet, to the edges of the sheet, while lifting from the sheet to allow even distribution of the fluid over it. The fluid for treating the sheet must of course, be introduced under the membrane at a pressure higher than the pressure above the membrane to cause the membrane to lift from the skin, and this may be done without causing appreciable separation of the membrane from the surface of the bed adjacent the edges of the sheet. In this manner a selective sealing of the more pervious uncovered areas of the bed may be effected, thus rendering the apparatus suitable for sheets of various sizes and shapes.

The improvements presented by this invention are directed to accelerating the treatment by simplifying the operation involved in positioning the sheet in the apparatus and in forcing the membrane against the bed, and by increasing the treating fluid pressure necessary to separate the membrane from the edges of the sheet, thereby the treating fluid may be delivered to the sheet at a higher pressure and at a higher rate.

Necessarily involved in using apparatus of the type described in my copending application Ser. No. 233,924, filed June 27, 1951, is the placing of the sheet on the porous bed with the membrane over the sheet and bed. According to the present invention, a flexible preferably somewhat elastic membrane is fixed over the bed, in extended spaced relation thereto, with an elongated opening between a marginal edge of the membrane and the upper surface of the bed through which the sheet may be inserted edgewise between the bed and membrane. This space is then closed by inflating the membrane against the surface of the bed fluid under pressure, and the treating fluid may then be delivered between the sheet and membrane to the surface of the sheet. There is thus eliminated the necessity of uncovering the supporting bed to place the sheet on it and of then spreading the membrane over the bed. To resist the upward force of the fluid under pressure and permit inflation of the membrane downwardly into contact with the bed, a supporting member is provided over the bed and membrane.

Inasmuch as the membrane is preferably somewhat elastic, a substantially inelastic flexible web strip supporting and reinforcing a marginal region of the membrane at the elongated opening between the membrane and bed is preferably provided to prevent ballooning and bursting of the membrane through the opening while allowing the application of high inflating pressures.

A further feature preferably included in apparatus embodying this invention is a substantially rigid backing member situated over the membrane in close spaced relation to the bed. The backing member permits the membrane to lift only a limited distance from the sheet when the fluid is introduced between the membrane and sheet. A pressure differential across the membrane resulting in a net lifting force tending to separate the membrane from the edges of the sheet can then only be developed in the relatively small area where the membrane rises from the sheet and extends upward to the backing member, the upward pressure against the preponderant central portion of the raised part of the membrane being counterbalanced by the equal downward pressure exerted by the backing member.

This invention will be further appreciated from the following detailed description of a preferred embodiment thereof, and from the accompanying drawings in which:

Fig. 1 is a view in cross section elevation of a preferred embodiment of the invention, Fig. 2 is a perspective view of a section of a preferred supporting pan forming part of the porous bed, Fig. 3 is a perspective view of a section of a tray forming part of the porous bed, Fig. 4 is a schematic diagram showing apparatus of the invention equipped with means for introducing the membrane inflating fluid and the treating fluid, Figs. 5 and 6 are fragmentary views in cross section showing successive steps in the functioning of the edge sealing membrane during operation of the invention, Fig. 7 is a front elevation showing the means for supporting the membrane in spaced relation over the bed.

Fig. 8 is a view in cross section elevation of another embodiment of the invention, and Fig. 9 is a view taken at 9—9 in Fig. 8 showing a plan of the membrane.

The apparatus consists in general of a porous bed 10 and an elastic impervious membrane 12 secured at its margins in spaced relation over the bed to provide an elongated opening e. g. at 14, between the edge of the membrane and the bed permitting edgewise insertion of the sheet 16 to be treated. Also provided are pressure conduits for inflating the membrane downwardly against the bed, and a fluid conduit for introducing the fluid to treat the sheet between the sheet and membrane.

In the preferred embodiment illustrated in Fig. 1 the porous bed 10 is supported on a staging 18 which in turn is supported on a base 20. The membrane 12 is secured at its marginal edges to a reinforced pressure head plate 22 also rigidly mounted to the base 20 over the bed 10 conveniently by means of bolts 23 (Fig. 7) extending between the pressure head plate 22 and the base 20 at opposite sides thereof, but not in the region of the elongated opening 14.

To permit the introduction of the treating fluid between the membrane 12 and sheet 16, the membrane is provided with a hole the edges 15 of which are secured to the pressure head plate 22, and a pressure equalizing conduit 24 and fluid conduit 26 extend through the pressure head plate to the hole. The securing of the membrane at the edges of the hole therein is conveniently accomplished by a clamping ring 17 bolted to the pressure head plate 22 with the edges 15 of the hole secured between the clamping ring and head plate.

A number of inflating conduits 28, also passing through the pressure head plate 22, terminate above the membrane 12 and provide means for applying an inflating pressure to the membrane. In order that substantial inflating pressure may be applied without bursting the membrane 12 through the elongated opening (as at 14) between its edge and the bed 10, a reinforcing web strip 30, for instance of canvas or other flexible substantially inelastic material, extends from the edge of the membrane inwardly sufficiently to be engaged and held between the membrane and the top surface of the bed when the membrane is inflated. The reinforcing strip 30 conveniently extends around and reinforces the entire outer edge of the membrane 12, and is secured with the edges of the membrane between the outer edge of the pressure head plate 22 and a rim 29 bolted to the head plate.

Integral with the pressure head plate 22 is a backing member 32 having a substantially flat lower surface overlying the membrane, to support it in close spaced relation to the sheet when the fluid for treating the sheet is introduced between the sheet and membrane.

The membrane 12 may consist of any flexible preferably elastic material, for instance chloroprene, rubber, or other synthetic films well known to the art.

The porous bed 10 in the illustrated embodiment consists of a supporting pan 10a shown in Fig. 2 and a removable tray 10b shown in Fig. 3. The pan is constructed to support the tray while providing free drainage from beneath and consists of a flat sheet metal shell 34 having upturned edges 35 and a drain conduit 36 and on which are situated a plurality of reticulated layers, and a foraminous surface plate 38. The reticulated layers are suitably a wide mesh heavy wire screen 39 of for instance 8 ga. wire with ½" mesh, and two layers of expanded sheet metal 40 and 41. The tray 10b provides a porous surface, preferably of fine texture, for supporting the sheet to be treated and for introducing and removing the sheet from the apparatus. A suitable construction utilizes a foraminous sheet steel bottom 42, on which are supported one or more fine wire screens 44, e. g. 40–100 mesh, and a fibrous surface ply 46 providing a smooth yet porous surface, conveniently paper impregnated and rendered wet strong with nylon or similar insoluble synthetic organic film-forming resin. The foraminous bottom 40 is turned over at its edges to secure the tray in assembled relation.

In the illustrated embodiment the shell 34 is formed with an outwardly extending apron 47 which serves as a support and guide for the tray 10b when it is not situated on the pan 10a.

A typical installation includes in addition to the above described treating apparatus, connections to the various conduits, and control means for supplying the fluids necessary for operation, such as shown in Fig. 4. The membrane inflating conduits 28 are connected through a manifold 48 to a supply of compressed air, while the fluid conduit 26 connects through a quick opening gate valve 50 to a reservoir tank 52. A valved conduit 54 connects the top of the reservoir 52 with the manifold 48, preferably at a point in the manifold remote from the compressed air inlet to assure against the possibility of creating, while air is flowing, a pressure in the conduit 54 greater than the pressure inflating the membrane. The pressure equalizing conduit 24 connects, through a valve, to the top of the reservoir 52, and pressure relief vents 56 and 60 connect with manifold 48 and the top of the reservoir 52 respectively to provide pressure relief at the end of the operation.

In a typical operation, such as in the dehydration of a water-wet untanned hide, all pressures are relieved and the reservoir 52 is provided with the desired quantity of a dehydrating liquid such as acetone. The hide 16 is then placed flat on the tray 10b which is then inserted between the pan 10a and the membrane 12. When in place, the vent lines 56 and 60, and the pressure equalizing lines 24 and 54 are closed and compressed air at a pressure sufficient to inflate the membrane, typically about 10 p. s. i. g., is then admitted through the manifold 48 to the membrane inflating conduits 28. At this point, the membrane is pressed flat against both the hide and the surface of the tray as shown in Fig. 5. The reinforcing web 30 it will be seen, extends between the membrane and upper surface of the bed and reinforces the membrane against the inflating pressure.

At this stage the pressure line 54 is opened, thus providing over the liquid in the reservoir 52 the same pressure as exists over the membrane, and the equalizing conduit 24 is then opened to equalize the pressure across that portion of the membrane overlying the hide 16, thus causing relaxation of the membrane where it covers the hide. Inasmuch as atmospheric pressure is beneath the bed, the membrane is still maintained in tight close contact with the bed in those areas uncovered by the hide, and the hide is similarly urged against the bed by the pressure now applied over it. The gate valve 50 is now opened quickly, allowing the dehydrating liquid to flow rapidly onto the hide below the membrane under its gravity head, the air pressures above and below the reservoir being equal, and through the hide under the pressure differential across it.

As the dehydrating liquid floods over the surface of the hide the membrane remains in contact with the uncovered portion of the bed up to the edges of the hide, and is not separated from the edges of the hide by the liquid beneath it unless its pressure is excessive. It has been found, however, that in a typical embodiment a pressure differential of 15 inches of water may readily be applied over the hide and across the membrane without causing separation at the edges, by providing a backing member limiting the space between the bed and membrane to about ½ inch. The major area of the membrane over the hide thus contacts the backing member when the dehydrating liquid is introduced (as suggested in Fig. 6) and the differential in the dehydrating liquid pressure and the membrane inflating pressure can be applied only in the relatively narrow area where the membrane rises from the edges of the hide, the area designated A in Fig. 6. By reducing the spacing to less than ½ inch even greater pressure differentials may be applied, but any spacing whereby a substantial, e. g. in excess of 20%, portion of the raised section of the membrane contacts the backing member pro tanto decreases the area in which a pressure differential resulting in a net lifting force may be applied, and accordingly increases the permissible pressure at which the treating fluid may be delivered.

After the liquid has permeated the sheet and drained from the bed through the drain conduit 30, the pressure vents 56 and 60 are opened to relieve all pressures and allow the membrane 12 to deflate, and the sheet 16 on the tray 10b may thereafter be removed.

It will be noted that in the preferred operation outlined above, the pressure equalizing conduit 24 is opened before the treating fluid is supplied to the sheet, whereby the fluid is delivered under its own head. It is frequently convenient, however, not to open the pressure equalizing conduit 24 and thereby to deliver the treating fluid under the additional pressure inflating the membrane. This results in a much faster delivery, of course, and the possibility that the impact of the fluid will separate the membrane from the edges of the sheet, but when low pressures are used, or when the valve 50 is opened slowly, the effects of such impact are not serious.

A modified form of the apparatus of this invention is shown in Figs. 8 and 9. In this embodiment, the inflatable membrane, instead of being fastened about its edges to a head plate, is in the form of a flat, inflatable bag 70, surrounding the fluid conduit 26. This construction is sometimes preferred when the membrane is of a material having little or no elasticity, such as a rubberized fabric. With membranes of such materials, it is frequently difficult to secure the edges of the membrane to the head plate in a manner permitting inflation without imparting serious stresses tending to rupture the membrane. It has been found that this difficulty is overcome if the membrane is formed as a bag which may expand in both directions.

In this embodiment of the invention, the apparatus is conveniently provided with a top plate 72 supported over the porous bed on overhead beams 74 mounted on bolts 76 to the base 20. The top plate 72 provides a support for the top of the inflatable bag 70 when the inflating pressure is applied.

The inflatable bag 70, as best shown in Figure 9, consists conveniently of a pair of coterminous sheets of suitable membrane material, each perforated at a central region to accommodate the fluid conduit 26, and sealed together at their outer edges and at the edges of the central perforation. One or more ports 78 are provided in the upper membrane by which connection may be made to the inflating conduits 28.

The inflatable bag thus formed is secured at the central perforation about the end of the fluid conduit 26 conveniently by means of compression flanges 79 and 81, and is held extended over the porous bed 10 by tension springs 80 extending between the corners of the bag 70 and four of the corner bolts 76. Connections to the inflating conduits 28 are made with the ports 78.

In the operation of this embodiment of the invention, the inflating pressure expands the bag upward against the top plate 72 and downward against the porous bed 10 and any sheet 16 situated thereon, while the corner springs 80 yield to permit any contraction in plan area that might occur. When inflated, the lower membrane forming the bag 70 covers the porous bed and sheet and the fluid for treating the sheet may be introduced through the fluid conduit 26 in the same manner as described above with reference to the embodiment shown in Fig. 1. Upon relief of the inflating pressure, deflation and lifting of the membrane from the sheet 16 and porous bed 10 is caused by the outward tension exerted by the springs 80. When deflated, the sheet may be removed and replaced for a subsequent operational cycle.

It will be understood that the foregoing description is by way of illustration and that modifications readily occurring to men skilled in the art may be made to the apparatus without departing from the scope of this invention.

This application is a continuation-in-part of applicant's copending application, Ser. No. 393,377, filed November 20, 1953, now abandoned.

Having thus disclosed my invention and described in detail an illustrative embodiment thereof, I claim as new and desire to secure by Letters Patent:

1. Apparatus for treating pervious sheets with fluids comprising a porous bed having a substantially flat and horizontal upper surface, a supporting member over said bed, an impervious membrane positioned below said supporting member over and normally spaced from the bed with the space between an edge of said membrane and the upper surface of the bed being open whereby a sheet may be inserted between the bed and membrane, means for applying a fluid under pressure to the top of the membrane to urge said membrane into contact with the bed, and a conduit for delivering a fluid between the bed and membrane.

2. Apparatus for treating pervious sheets with fluids comprising a porous bed having a substantially flat and horizontal upper surface, a supporting member over said bed, an elastic impervious membrane secured at its margins to and below said supporting member and positioned over and normally spaced from the bed with the space between an edge of said membrane and the upper surface of the bed being open whereby a sheet may be inserted between the bed and membrane, means for applying a fluid under pressure to the top of the membrane to urge said membrane into contact with the bed, and a conduit for delivering a fluid between the bed and membrane.

3. Apparatus for treating pervious sheets with fluids comprising a porous bed having a substantially flat and horizontal upper surface, a supporting member over said bed, an elastic impervious membrane positioned below said supporting member over and normally spaced from the bed with the space between an edge of said membrane and the upper surface of the bed being open whereby a sheet may be inserted between the bed and membrane, a substantially inelastic flexible strip reinforcing said marginal edge of the membrane, means for applying a fluid under pressure to the top of the membrane to urge said membrane into contact with the bed, and a conduit for delivering a fluid between the bed and membrane.

4. Apparatus for treating pervious sheets with fluids comprising a porous bed having a substantially flat and horizontal upper surface, an impervious membrane positioned over and normally spaced from the bed with the space between an edge of said membrane and the upper surface of the bed being open whereby a sheet may be inserted between the bed and membrane, a rigid backing member over said membrane in close substantially uniform spaced relation to said bed, means for applying a fluid under pressure to the top of the membrane to urge said membrane into contact with the bed, and a conduit for delivering a fluid between the bed and membrane.

5. Apparatus for treating pervious sheets with fluids comprising a porous bed having a substantially flat and horizontal upper surface, a supporting member over said bed, an impervious membrane positioned below the supporting member over and normally spaced from the bed with the space between an edge of said membrane and the upper surface of the bed being open whereby a sheet may be inserted between the bed and membrane, a porous tray insertable between said bed and membrane through said space, means for applying a fluid under pressure to the top of the membrane to urge said membrane into contact with the bed, and a conduit for delivering a fluid between the bed and membrane.

6. Apparatus for treating pervious sheets with fluids comprising a porous bed having a substantially flat and horizontal upper surface, a supporting member over said bed, an elastic impervious membrane secured at its margins to and below said supporting member and positioned over and normally spaced from the bed with the space between an edge of said membrane and the upper surface of the bed being open whereby a sheet may be inserted between the bed and membrane, a porous tray insertable between said bed and membrane through said space, means for applying a fluid under pressure to the top of the membrane to urge said membrane into contact with the bed, and a conduit for delivering a fluid between the bed and membrane.

7. Apparatus for treating pervious sheets with fluids comprising a porous bed having a substantially flat and horizontal upper surface, an elastic impervious membrane positioned over and normally spaced from the bed with the space between an edge of said membrane and the upper surface of the bed being open whereby a sheet may be inserted between the bed and membrane, a substantially inelastic flexible strip reinforcing said marginal edge of the membrane, a rigid backing member over said membrane in close substantially uniform spaced relation to said bed, an inflating conduit communicating with the space between the backing member and membrane, a fluid reservoir, a fluid conduit leading from the reservoir through a quick opening valve and through the membrane to the space between the membrane and the bed, a valved conduit communicating from the space between the backing member and membrane to the reservoir, and a pressure equalizing conduit communicating from the space between the membrane and bed to the reservoir.

8. Apparatus for treating pervious sheets with fluids comprising a porous bed having a substantially flat and horizontal upper surface, a supporting member over said bed, an inflatable bag including an impervious membrane supported below said supporting member over and normally spaced from the bed, means for inflating said bag to urge said membrane into contact with the bed, and a conduit for delivering a fluid between the bed and membrane.

9. Apparatus for treating pervious sheets with fluids comprising a porous bed having a substantially flat and horizontal upper surface, an inflatable bag including an impervious membrane yieldingly supported below said supporting member over and normally spaced from the bed, a backing member over the inflatable bag, means for inflating said bag to urge said membrane into contact with the bed, and a conduit for delivering a fluid between the sheet and membrane.

10. Apparatus for treating pervious sheets with fluids comprising a porous bed having a substantially flat and horizontal upper surface, a flat inflatable bag including an impervious membrane overlying the bed, yielding means holding said bag extended over and normally spaced from the bed, a backing member over the inflatable bag, means for inflating said bag, and a conduit for delivering a fluid between the sheet and membrane.

11. Apparatus for treating pervious sheets with fluids comprising a porous bed having a substantially flat and horizontal upper surface, an elastic impervious membrane, said membrane being secured over and normally spaced from the bed with the space between a marginal edge of said membrane and the upper surface of the bed being open whereby a sheet may be inserted between the bed and membrane, a substantially inelastic flexible strip reinforcing said marginal edge of the membrane, a rigid backing member over said membrane in close substantially uniform spaced relation to said bed, an inflating conduit communicating with the space between the backing member and membrance, a fluid reservoir, a valved fluid conduit leading from the reservoir through the membrane to the space between the membrane and the bed, and a conduit communicating from the space between the backing member and membrane to the reservoir.

12. Apparatus for treating pervious sheets with fluids comprising a porous bed having a substantially flat and horizontal upper surface, a supporting member over said bed, an impervious membrane positioned below the supporting member over and normally spaced from the bed with the space between an edge of said membrane and the upper surface of the bed being open whereby a sheet may be inserted between the bed and membrane, means for applying a fluid under pressure to the top of the membrane to urge the membrane into contact with the bed, a fluid reservoir, a valved fluid conduit leading from the reservoir through the membrane to the space between the membrane and the bed, and a conduit connecting the fluid under pressure above the membrane to the reservoir.

13. Apparatus for treating pervious sheets with fluids comprising a porous bed having a substantially flat and horizontal upper surface, a supporting member over said bed positioned below the supporting member, an impervious membrane over and normally spaced from the bed with the space between an edge of said membrane and the upper surface of the bed being open whereby a sheet may be inserted between the bed and membrane, means for applying a fluid under pressure to the top of the membrane to urge the membrane into contact with the bed, a fluid reservoir, a valved fluid conduit leading from the reservoir through the membrane to the space between the membrane and the bed, a valved conduit connecting the fluid under pressure above the membrane to the reservoir, and a pressure equalizing conduit communicating from the space between the membrane and bed to the reservoir.

14. Apparatus for treating pervious sheets with fluids comprising a porous bed having a substantially flat and horizontal upper surface, an inflatable bag including an impervious membrane yieldingly supported over and spaced from the bed with the space between an edge of said membrane and the upper surface of the bed being open whereby a sheet may be inserted between the bed and membrane, a backing member over the inflatable bag, means for inflating said bag, a fluid reservoir, a valved fluid conduit leading from the reservoir through the membrane to the space between the membrane and the bed, and a conduit communicating from the interior of the bag to the reservoir.

15. Apparatus for treating pervious sheets with fluids comprising a porous bed having a substantially flat and horizontal upper surface, an inflatable bag including an impervious membrane yieldingly supported over and spaced from the bed with the space between an edge of said membrane and the upper surface of the bed being open whereby a sheet may be inserted between the bed and membrane, a backing member over the inflatable bag, means for inflating said bag, a fluid reservoir, a valved fluid conduit leading from the reservoir through the membrane to the space between the membrane and the bed, a valved conduit communicating from the interior of the bag to the reservoir, and a pressure equalizing conduit communicating from the space between the membrane and bed to the reservoir.

16. Apparatus for treating pervious sheets with fluids comprising a porous bed having a substantially flat and horizontal upper surface, a supporting member over said bed, an inflatable impervious membrane positioned over and normally spaced from the bed, means for applying a fluid under pressure to the top of the membrane to urge the membrane into contact with the bed, and a conduit extending through the membrane for delivering a fluid between the bed and membrane.

17. Apparatus for treating pervious sheets with fluids comprising a porous bed having a substantially flat and horizontal upper surface, a supporting member over said bed, an inflatable impervious membrane positioned over and normally spaced from the bed, means for applying a fluid under pressure to the top of the membrane to urge the membrane into contact with the bed, a fluid reservoir, a conduit leading from the reservoir to the space between the bed and membrane, and a conduit connecting the fluid under pressure above the membrane to the reservoir.

18. Apparatus for treating pervious sheets with fluids comprising a porous bed having a substantially flat and horizontal upper surface, a supporting member over said bed, an inflatable impervious membrane positioned over and normally spaced from the bed, means for applying a fluid under pressure to the top of the membrane to urge the membrane into contact with the bed, a fluid reservoir, a conduit leading from the reservoir to the space between the bed and membrane, a conduit connecting the fluid under pressure above the membrane to the reservoir, and a pressure equalizing conduit communicating from the space between the membrane and bed to the reservoir.

References Cited in the file of this patent

UNITED STATES PATENTS 2,702,229    Ushakoff _____ Feb. 15, 1955